United States Patent
Karnam et al.

(10) Patent No.: US 12,536,084 B2
(45) Date of Patent: Jan. 27, 2026

(54) CLUSTER NODE SELECTION WITH OFF-BAND METRICS

(71) Applicant: Dell Products L.P., Round Rock, TX (US)

(72) Inventors: Sirisha Karnam, Bangalore (IN); Charulata Ojha, Rochestown (IE); Tamilarasan Janakiraman, Rochestown (IE)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 18/764,059

(22) Filed: Jul. 3, 2024

(65) Prior Publication Data

US 2026/0010452 A1    Jan. 8, 2026

(51) Int. Cl.
*G06F 11/30* (2006.01)
*G06F 11/07* (2006.01)

(52) U.S. Cl.
CPC ...... *G06F 11/3055* (2013.01); *G06F 11/0709* (2013.01); *G06F 11/0781* (2013.01); *G06F 11/3006* (2013.01)

(58) Field of Classification Search
CPC ............. G06F 11/0709; G06F 11/0781; G06F 11/3006; G06F 11/3051; G06F 11/3055
See application file for complete search history.

(56) References Cited

U.S. PATENT DOCUMENTS

| | | | | |
|---|---|---|---|---|
| 8,108,712 B1 * | 1/2012 | Carlino | ............... | G06F 11/0757 714/4.1 |
| 2021/0279112 A1 * | 9/2021 | Janakiraman | ......... | G06F 9/5083 |

* cited by examiner

*Primary Examiner* — Joseph R Kudirka
(74) *Attorney, Agent, or Firm* — Amin, Turocy & Watson, LLP

(57) ABSTRACT

A system can determine respective on-band metrics for respective nodes of a group of nodes that are part of a computing cluster, wherein a first part of the group of nodes are active to the computing cluster, and wherein a second part of the group of nodes are inactive to the computing cluster. The system can determine respective off-band metrics for the respective nodes. The system can determine respective utilization scores of the respective nodes based on the respective on-band metrics. The system can determine respective reliability scores of the respective nodes based on the respective off-band metrics. The system can determine respective vulnerability scores of the respective nodes based on the respective on-band metrics. The system can modify a number of nodes of the first part of the group of nodes based on the respective utilization scores, the respective reliability scores, and the respective vulnerability scores.

20 Claims, 11 Drawing Sheets

US 12,536,084 B2

CLUSTER NODE SELECTION WITH OFF-BAND METRICS

BACKGROUND

A computing cluster can comprise multiple computing nodes.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine respective on-band metrics for respective nodes of a group of nodes that are part of a computing cluster, wherein a first part of the group of nodes are active to the computing cluster, wherein a second part of the group of nodes are inactive to the computing cluster, and wherein the respective on-band metrics are associated with respective operating systems of the respective nodes. The system can determine respective off-band metrics for the respective nodes, wherein the respective off-band metrics are associated with respective baseboard management controllers of the respective nodes. The system can determine respective utilization scores of the respective nodes based on the respective on-band metrics, wherein the respective utilization scores indicate respective computing loads. The system can determine respective reliability scores of the respective nodes based on the respective off-band metrics, wherein the respective utilization scores indicate respective overall system health values. The system can determine respective vulnerability scores of the respective nodes based on the respective on-band metrics, wherein the respective vulnerability scores indicate respective system security vulnerabilities. The system can modify a number of nodes of the first part of the group of nodes based on the respective utilization scores, the respective reliability scores, and the respective vulnerability scores.

An example method can comprise determining, by a system comprising at least one processor, respective utilization scores of respective nodes based on respective on-band metrics of the respective nodes, wherein the respective utilization scores indicate respective computing loads, and wherein the respective on-band metrics are associated with respective operating systems of the respective nodes. The method can further comprise determining, by the system, respective reliability scores of the respective nodes based on respective off-band metrics of the respective nodes, wherein the respective reliability scores indicate respective overall system health values, and wherein the respective off-band metrics are associated with respective baseboard management controllers of the respective nodes. The method can further comprise determining, by the system, respective vulnerability scores of the respective nodes based on the respective on-band metrics, wherein the respective vulnerability scores indicate respective system security vulnerabilities. The method can further comprise modifying, by the system, a number of nodes of the respective nodes that are active to a cluster based on the respective utilization scores, the respective reliability scores, and the respective vulnerability scores.

An example non-transitory computer-readable medium can comprise instructions that, in response to execution, cause a system comprising a processor to perform operations. These operations can comprise determining respective reliability scores of respective network nodes based on respective off-band metrics of the respective network nodes. These operations can further comprise determining respective vulnerability scores of the respective network nodes based on respective on-band metrics of the respective network nodes. These operations can further comprise modifying a number of network nodes of the respective network nodes that are active to a cluster based on the respective reliability scores and the respective vulnerability scores.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
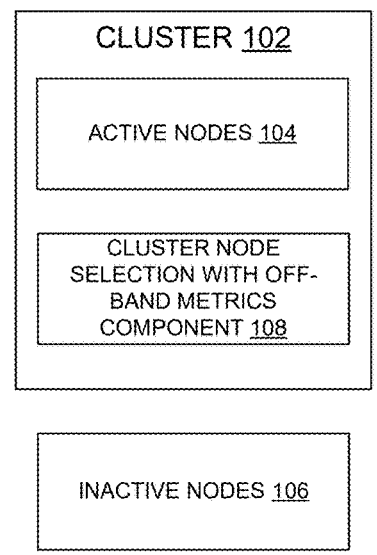
FIG. 1 illustrates an example system architecture that can facilitate cluster node selection with off-band metrics, in accordance with an embodiment of this disclosure.

There can be groups of computing nodes that operate containerized applications. A containerized application can generally comprise a computer application that runs in one container, or is spread across multiple containers. A container can generally comprise executable code from an application along with that code's dependencies (e.g., runtime, libraries, system tools, and/or settings), so that that container can be easily moved between computers.

With containerized applications, it can be that addition or removal of a node is can be a critical operation that is driven by evolving workloads. However, a lack of awareness regarding essential off-band metrics can be a problem. As clusters dynamically adjust their nodes, selecting nodes without insights into off-band metrics can compromise operational efficiency and reliability.

A seamless orchestration of nodes can be pivotal for adapting to evolving workloads. Problems can arise from a lack of insights into off-band metrics, which can be crucial for ensuring optimal system health and reliability. The present techniques can address this problem by empowering clusters with intelligent off-band metric awareness, which can enhance operational efficiency and adaptability.

An addition or removal of can be is a critical operation, driven by evolving workloads. A challenge can emerge during this process-a lack of awareness regarding off-band metrics. As clusters dynamically adjust their nodes, selecting servers without insights into off-band metrics can compromise operational efficiency and reliability.

An on-band network can be associated with an operating system, and can provide metrics such as central processing unit (CPU) and random access memory (RAM) performance.

An off-band network can be designated to a baseboard management controller (BMC), and can provide metrics that encompass the comprehensive health status of the entire system, including aspects such as CPU health, cooling system operation, and battery health.

The present techniques can be implemented to facilitate a comprehensive solution focused on training a controller/scheduler responsible for dynamically adding or removing nodes. This training can equip the controller/scheduler with an understanding of off-band metrics, enabling informed decisions during node adjustments.

Training components can include a utilization score and a reliability score. A utilization score can be derived from on-band network analysis (e.g., of CPU and memory) to gauge a current server load. A reliability score can be obtained from off-band network analysis, utilizing an application programming interface (API) for overall system health.

System health metrics are categorized into various hardware and environmental aspects. The following is an example breakdown of the categories:
  CPU
  Battery
  Cooling (fan and temperature)
  Memory (dual in-line memory modules (DIMMs))
  Power
  Removable media
  Network devices (network interface cards (NICs))
  Voltages
  Peripheral component interconnect express (PCIe) slots
  Intrusion
  Front panel (live front panel feed and front panel light-emitting diodes (LEDs))
  Accelerators (graphics processing units (GPUs) and field programmable gate arrays (FPGAs))

These categories can encompass a comprehensive set of metrics that collectively provide a detailed overview of the system's health, performance, and environmental conditions.

A vulnerability score can also be used, which can be derived from on-band network vulnerability scans, assessing system security vulnerabilities using a common vulnerability scoring system (CVSS).

Controller/scheduler training can be performed as follows. In-depth off-band metric awareness can be performed. Training can impart extensive about off-band metrics, ensuring that the controller/scheduler comprehends the significance of overall system health and component reliability.

Controller/scheduler training can also incorporate practical training on integrating and leveraging an API to collect and categorize overall system health, providing real-time insights for decision-making.

After training, a trained controller/scheduler can seamlessly integrate off-band metrics alongside traditional on-band metrics when adding or removing nodes. The trained controller/scheduler can utilize an intelligent scoring system to determine priority and health scores for each potential node in the cluster, ensuring a holistic approach to node management.

Where more pods/nodes need to be scheduled, and existing nodes are running out of capacity, or when a demand for resources decreases, and there is excess capacity in the cluster, a cluster autoscaler can be utilized. The cluster autoscaler can communicate with the controller. The controller can send a request to a daemon that operates across nodes of a cluster to fetch detailed information for each node.

After receiving the information from the daemon, the controller can check if the node is supposed to be added to or removed from the cluster.

If the requirement is to scale up, then the controller can apply the logic taking into consideration the off-band metrics (overall system health, CPU health, etc.) and on-band metrics (resource usage, pod scheduling failures, and other metrics) to pick a node with a best health (or a satisfactory health) to be added.

If the requirement is to scale down, then the controller can apply the logic taking into consideration the off-band metrics (overall system health, CPU health, etc.) and on-band metrics (resource usage, pod scheduling failures, and other metrics) to pick the node with the worst health (or sufficiently bad health) to be removed.

The controller can remove or add the selected node accordingly.

This example details the process in a case of pods scheduling involving a greater number of nodes. There can be other reasons why scaling up or down is performed.

Reasons for scaling up can include:
  Increased Workload: When the demand for resources (CPU, memory, etc.) surpasses a current capacity of the cluster, scaling up by adding more nodes can help meet the increased workload.
  Resource Constraints: If existing nodes are running out of resources and there is a need for more capacity to handle additional pods or applications, scaling up can ensure optimal performance.
  Improved Performance: Adding more nodes can distribute a workload, reducing contention for resources and enhancing overall system performance.
  High Pod Scheduling Failures: If there are frequent pod scheduling failures due to insufficient resources, adding nodes can address these failures and improve a scheduling success rate.

Adaptation to Peaks: During peak periods of demand, such as increased user activity or data processing, scaling up can allow a cluster to handle the higher load efficiently.

Reasons for scaling down can include:

Decreased Workload: During periods of reduced demand or lower resource utilization, scaling down can help optimize resource allocation and cost-effectiveness by removing unnecessary nodes.

Cost Optimization: Reducing the number of nodes can lower infrastructure costs, such as in cloud environments where resources can be billed based on usage.

Energy Efficiency: In on-premises environments, scaling down can reduce power consumption, and contributes to energy efficiency.

Idle Nodes: If nodes are consistently idle or have low resource utilization, scaling down can reclaim resources and allocate them more efficiently.

Maintaining Cost-Efficiency: Continuous monitoring of resource usage and scaling down when appropriate can help maintain a cost-efficient infrastructure without overprovisioning.

Auto-Scaling Efficiency: In environments with auto-scaling, scaling down can ensure that the cluster adapts to the actual workload, preventing unnecessary resource allocation.

Node health can be monitored as follows. In some examples, each node's health status is monitored by a process running on that node. The process can perform regular health checks and updates a node resource within a cluster API server with relevant status conditions. These conditions, which can include "ready," "out of disk," and others, can be crucial in determining an overall health of a node.

A program can be implemented to facilitate an integration of off-band metrics into a cluster ecosystem. This program can periodically update and save off-band metrics to a "node" resource. The process on each node can expose an application programming interface (API) endpoint that the program can interact with, which can ensure that the controller/scheduler has access to the latest off-band metrics during node selection processes.

The present techniques can be implemented to bridge a gap between clusters and off-band metrics, which can be used for optimal (or satisfactory) node selection. The present techniques can be implemented to empower clusters to make informed decisions based on a holistic understanding of server capabilities, which can facilitate enhanced performance, reliability, and adaptability to evolving workloads.

In prior approaches, configuring new nodes can be an approach to ensure that resource allocation aligns with the cluster's needs. Misconfigured resources can lead to underutilization or overutilization, which can negatively impact performance and cost-efficiency.

Relative to prior approaches, the present techniques can be implemented to facilitate custom metrics support. Beyond metrics like CPU and memory usage, custom metrics support can be facilitated. This flexibility can facilitate tailoring scaling decisions based on application-specific metrics, which can facilitate more precise and effective scaling strategies.

Relative to prior approaches, the present techniques can facilitate improved performance and stability. The present techniques can be implemented to facilitate provision based on an actual demand for resource allocation—not underutilization or overutilization. Applications with high/low demand for resource allocation can be handled with dynamic quick provisioning of nodes without performance degradation.

Node addition can be handled as follows. For a pool of physical nodes available for selection when adding a node to a cluster, retrieve an overall system health of each node using API calls. The healthiest (or sufficiently healthy) node can be chosen based on the following statuses:

x

If multiple nodes share the same overall health status, they can be prioritized based on the following subcategories of system health: memory, CPU, power, network, security, and accelerators. The priority order can be:

1. Memory
2. CPU
3. Power
4. Network
5. Security
6. Accelerators

The following are examples illustrating a node selection process.

If two nodes both have a Yellow overall health status but differ in their subcategory status (e.g., one has a Yellow CPU status while the other has a Yellow RAM status), the subcategory with the lowest priority (in this case, CPU) can be prioritized, and the corresponding node can be selected that has the RAM status as green.

If two nodes have the same overall health status and subcategory status, the resources available on each node can be considered, and they can be matched with the requirements. For instance, if a cluster with 4 nodes has one node down (with 2 CPUs and 2 gigabytes (GB) RAM), the available nodes can be compared to find the one with similar resources, and that node can be selected.

If there is a pool of three nodes with different overall health statuses (e.g., one Yellow, one Red, one Green), select the node with the highest overall health status (in this case, Green).

This approach can ensure optimal (or satisfactory) node selection based on overall system health, and prioritize specific health metrics when making decisions.

Node deletion can be handled as follows. A node to be deleted from a cluster can be identified. An impact of removing the node on the overall system health and resource availability can be determined.

Nodes for deletion can be prioritized based on the following criteria:

Red: Critical, unhealthy
Yellow: Warning, less healthy
Green: Healthiest

If multiple nodes share the same health status, they can be prioritized based on the following subcategories of system health: memory, CPU, power, network, security, and accelerators. The priority can be:

1. Memory
2. CPU
3. Power
4. Network
5. Security
6. Accelerators

Examples of a node deletion process are as follows. If multiple nodes have a Red overall health status, the node with the least critical impact on system health can be selected.

If two nodes have the same overall health status, deletion can be prioritized based on a subcategory with the highest priority, which can ensure minimal disruption to resource availability.

If there are nodes with different overall health statuses, deletion can be prioritized by selecting the node with the highest health status, which can minimize an impact on system health.

In some examples, this approach can ensure that nodes are deleted in a manner that minimizes disruption to system health and resource availability, and can prioritize a removal of nodes with a least critical impact.

Example Architectures

FIG. 1 illustrates an example system architecture 100 that can facilitate cluster node selection with off-band metrics, in accordance with an embodiment of this disclosure.

System architecture 100 comprises cluster 102, active nodes 106, and inactive nodes 110. Cluster 102 also comprises cluster node selection with off-band metrics component 108.

A computing cluster (e.g., cluster 102) can generally comprise multiple computers that function together in a way that they can logically be considered as one computer. A computing cluster can comprise multiple nodes (e.g., active nodes 106). In some examples, a computing cluster can execute workloads, such as those of one or more containerized applications.

Cluster 102 comprises active nodes 106, which are nodes of cluster 102 that are currently configured to have workloads of cluster 102 assigned to them. There are also inactive nodes 110, which can be used by cluster 102 to scale up, but are not currently part of cluster 102.

Over time, a need for more nodes (e.g., more compute resources) can be determined for cluster 102, and one or more nodes of inactive nodes 110 can be incorporated into cluster 102. In other examples, it can be that cluster 102 has excess processing resources relative to a current level of demand, and cluster 102 can be scaled down by converting one or more nodes of active nodes 106 to inactive nodes 110.

This process of scaling up and scaling down cluster 102 can be performed by cluster node selection with off-band metrics component 108, which can select nodes for addition to, or removal from, cluster 102 based on off-band metrics of the nodes (and can also base this on on-band metrics of the nodes).

Figure 11:
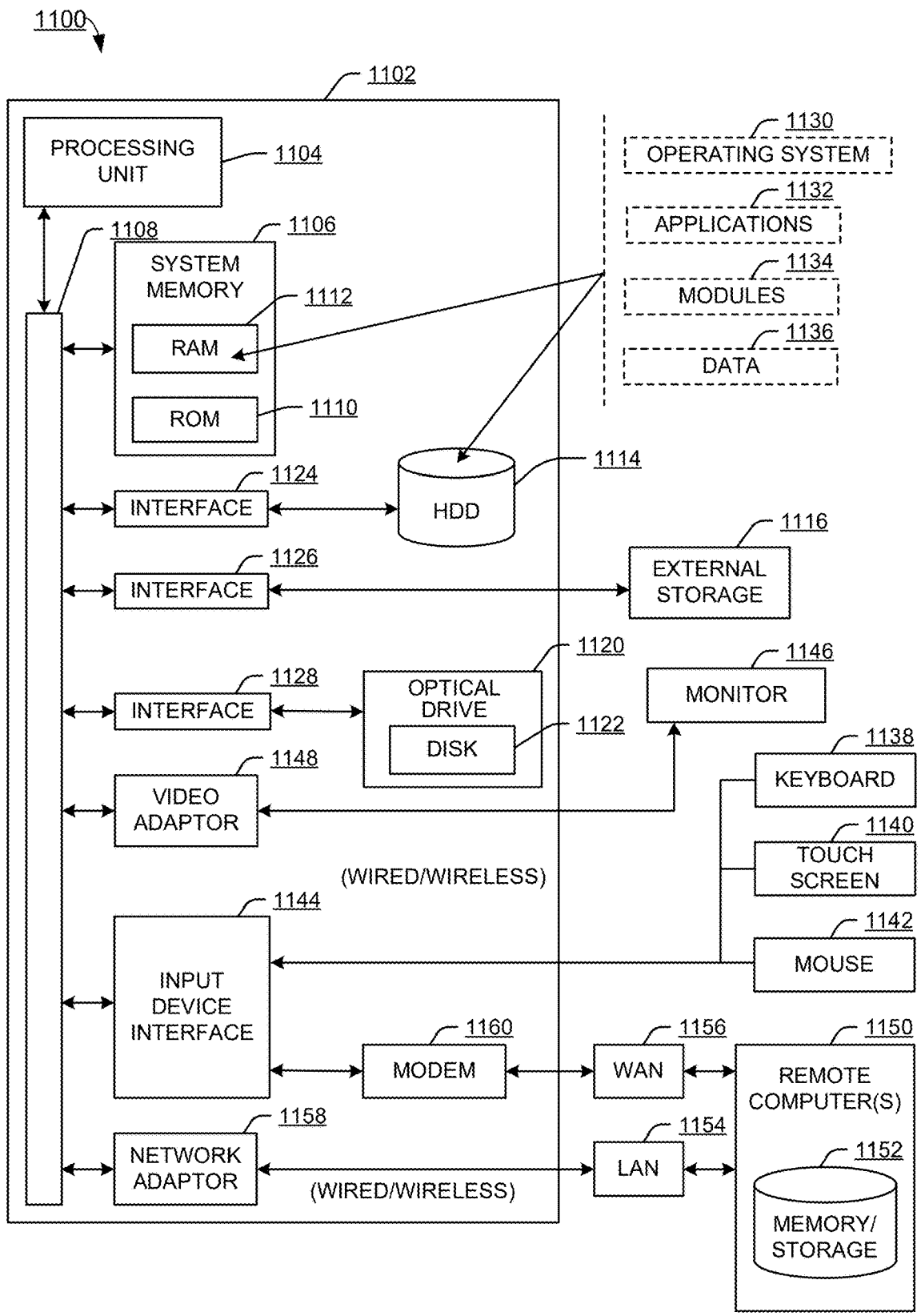
FIG. 11 illustrates an example block diagram of a computer operable to execute an embodiment of this disclosure.

Each of cluster 102, active nodes 106, and/or inactive nodes 110 can be implemented with part(s) of computing environment 1100 of FIG. 11.

In some examples, cluster node selection with off-band metrics component 108 can implement part(s) of the process flows of FIGS. 3-10 to facilitate cluster node selection with off-band metrics.

It can be appreciated that system architecture 100 is one example system architecture for cluster node selection with off-band metrics, and that there can be other system architectures that facilitate cluster node selection with off-band metrics.

Figure 2:
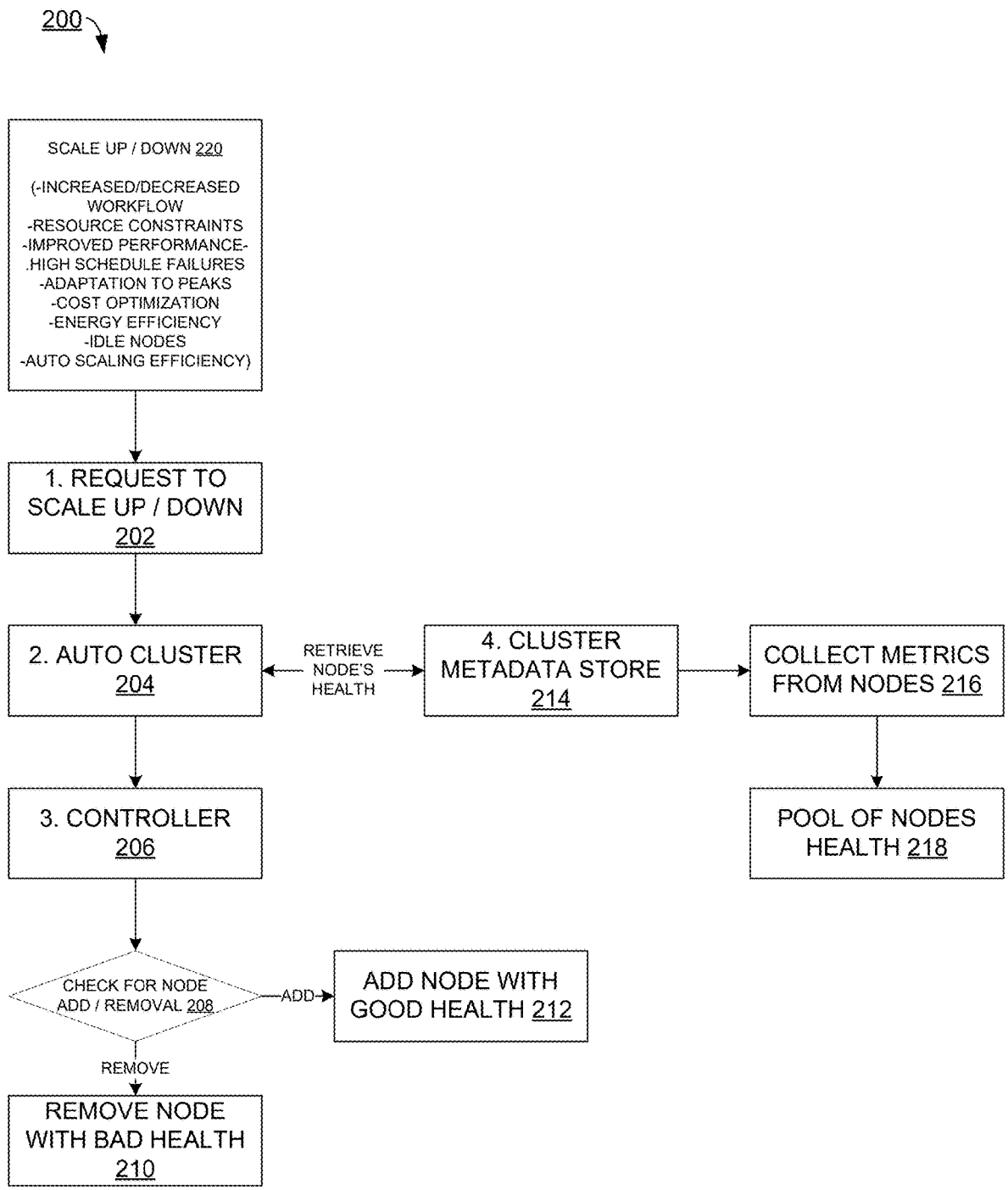
FIG. 2 illustrates another example system architecture that can facilitate cluster node selection with off-band metrics, in accordance with an embodiment of this disclosure.

FIG. 2 illustrates another example system architecture 200 for cluster node selection with off-band metrics, in accordance with an embodiment of this disclosure. In some examples, part(s) of system architecture 200 can be implemented by part(s) of system architecture 100 of FIG. 1 to facilitate cluster node selection with off-band metrics.

System architecture 200 comprises 1. request to scale up/down 202, 2. auto cluster 204, 3. controller 206, check for node add/removal 208, remove node with bad health 210, add node with good health 212, 4. cluster metadata store 214, collect metrics from nodes 216, pool of nodes health 218, and scale up/down 220.

Example Process Flows

Figure 3:
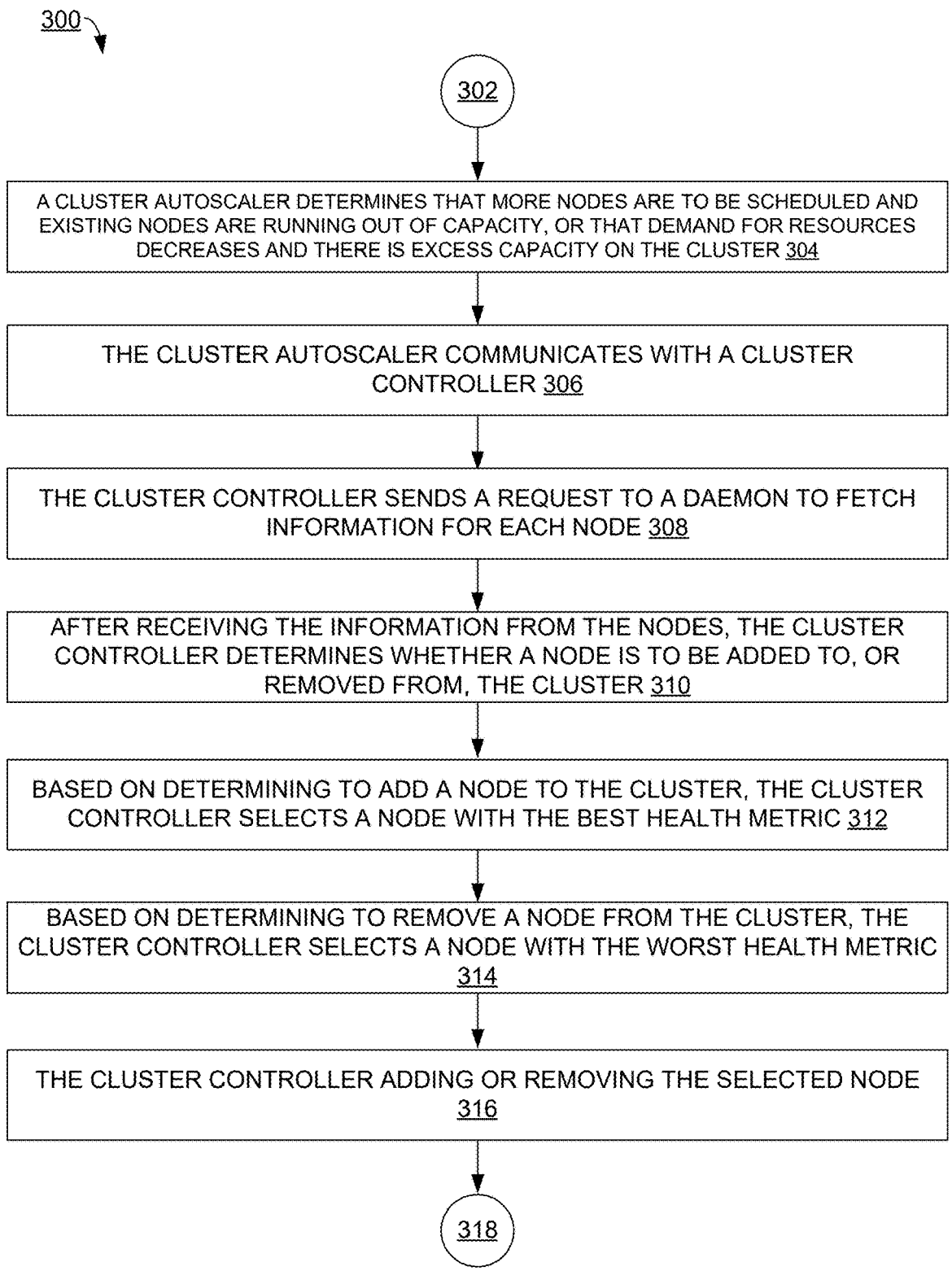
FIG. 3 illustrates an example process flow of a workflow that can facilitate cluster node selection with off-band metrics, in accordance with an embodiment of this disclosure.

FIG. 3 illustrates an example process flow 300 of a workflow that can facilitate cluster node selection with off-band metrics, in accordance with an embodiment of this disclosure. In some examples, one or more embodiments of process flow 300 can be implemented by system architecture 100 of FIG. 1, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 300 begins with 302, and moves to operation 304.

Operation 304 depicts that a cluster autoscaler determines that more nodes are to be scheduled and existing nodes are running out of capacity, or that demand for resources decreases and there is excess capacity on the cluster.

After operation 304, process flow 300 moves to operation 306.

Operation 306 depicts that the cluster autoscaler communicates with a cluster controller.

After operation 306, process flow 300 moves to operation 308.

Operation 308 depicts that the cluster controller sends a request to a daemon to fetch information for each node.

After operation 308, process flow 300 moves to operation 310.

Operation 310 depicts, after receiving the information from the nodes, the cluster controller determines whether a node is to be added to, or removed from, the cluster.

After operation 310, process flow 300 moves to operation 312.

Operation 312 depicts, based on determining to add a node to the cluster, the cluster controller selects a node with the best health metric.

After operation 312, process flow 300 moves to operation 314.

Operation 314 depicts, based on determining to remove a node from the cluster, the cluster controller selects a node with the worst health metric.

After operation 314, process flow 300 moves to operation 316.

Operation 316 depicts the cluster controller adding or removing the selected node.

After operation 316, process flow 300 moves to 318, where process flow 300 ends.

Figure 4:
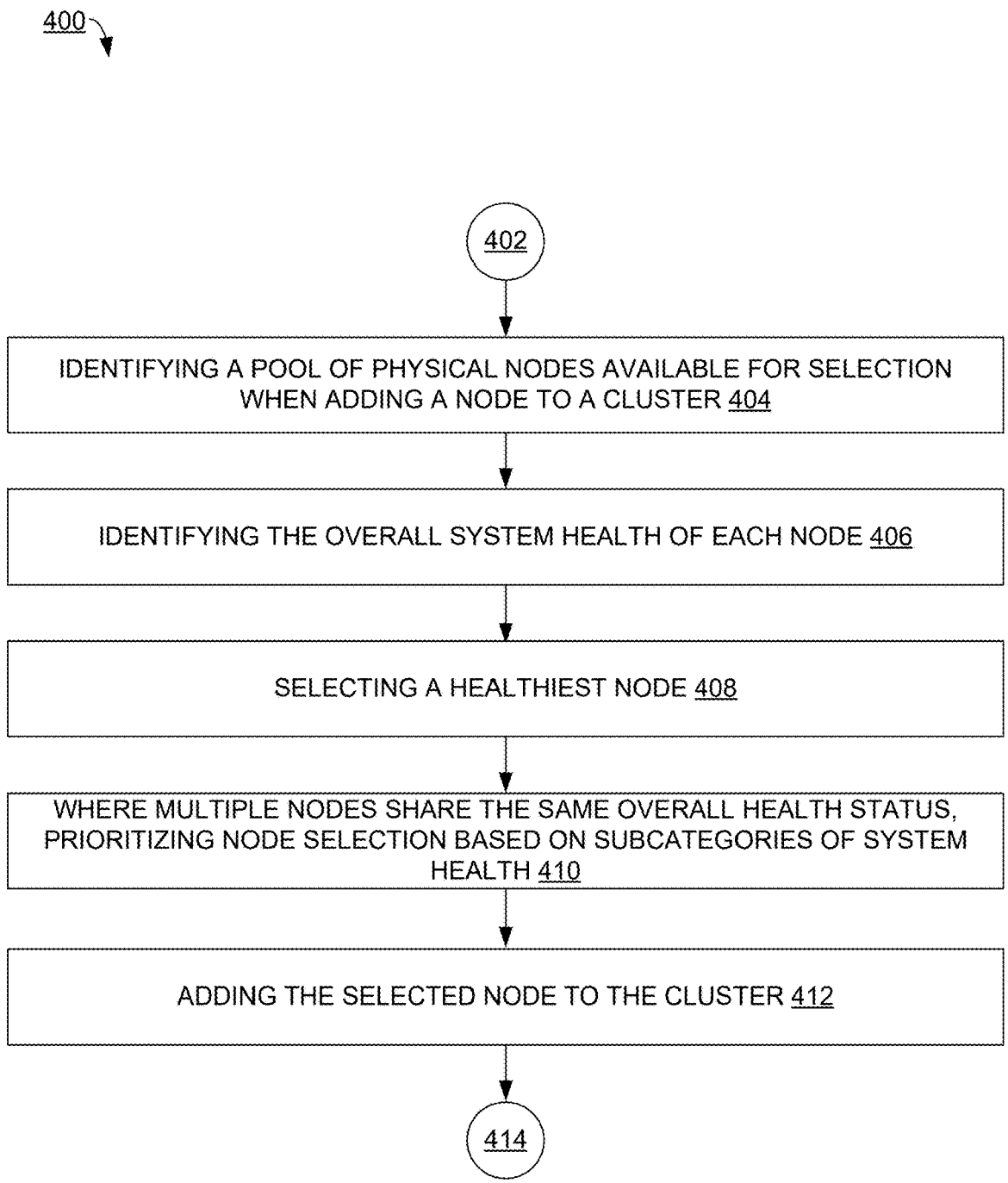
FIG. 4 illustrates an example process flow for adding a node to a cluster, and that can facilitate cluster node selection with off-band metrics, in accordance with an embodiment of this disclosure.

FIG. 4 illustrates an example process flow 400 for adding a node to a cluster, and that can facilitate cluster node selection with off-band metrics, in accordance with an embodiment of this disclosure. In some examples, one or more embodiments of process flow 400 can be implemented by system architecture 100 of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 300 of FIG. 3, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 400 begins with 402, and moves to operation 404.

Operation 404 depicts identifying a pool of physical nodes available for selection when adding a node to a cluster.

After operation 404, process flow 400 moves to operation 406.

Operation 406 depicts identifying the overall system health of each node. In some examples, this can be performed via API calls.

After operation 406, process flow 400 moves to operation 408.

Operation 408 depicts selecting a healthiest node. For example, health can be identified based on statuses of Green: Healthiest; Yellow: Warning, less healthy; and Red: Critical, unhealthy.

After operation 408, process flow 400 moves to operation 410.

Operation 410 depicts, where multiple nodes share the same overall health status, prioritizing node selection based on subcategories of system health. In some examples, the priority order of subcategories of system health can be memory (highest priority), CPU, power, network, security, and accelerators.

After operation 410, process flow 400 moves to operation 412.

Operation 412 depicts adding the selected node to the cluster.

After operation 412, process flow 400 moves to 414, where process flow 400 ends.

Figure 5:
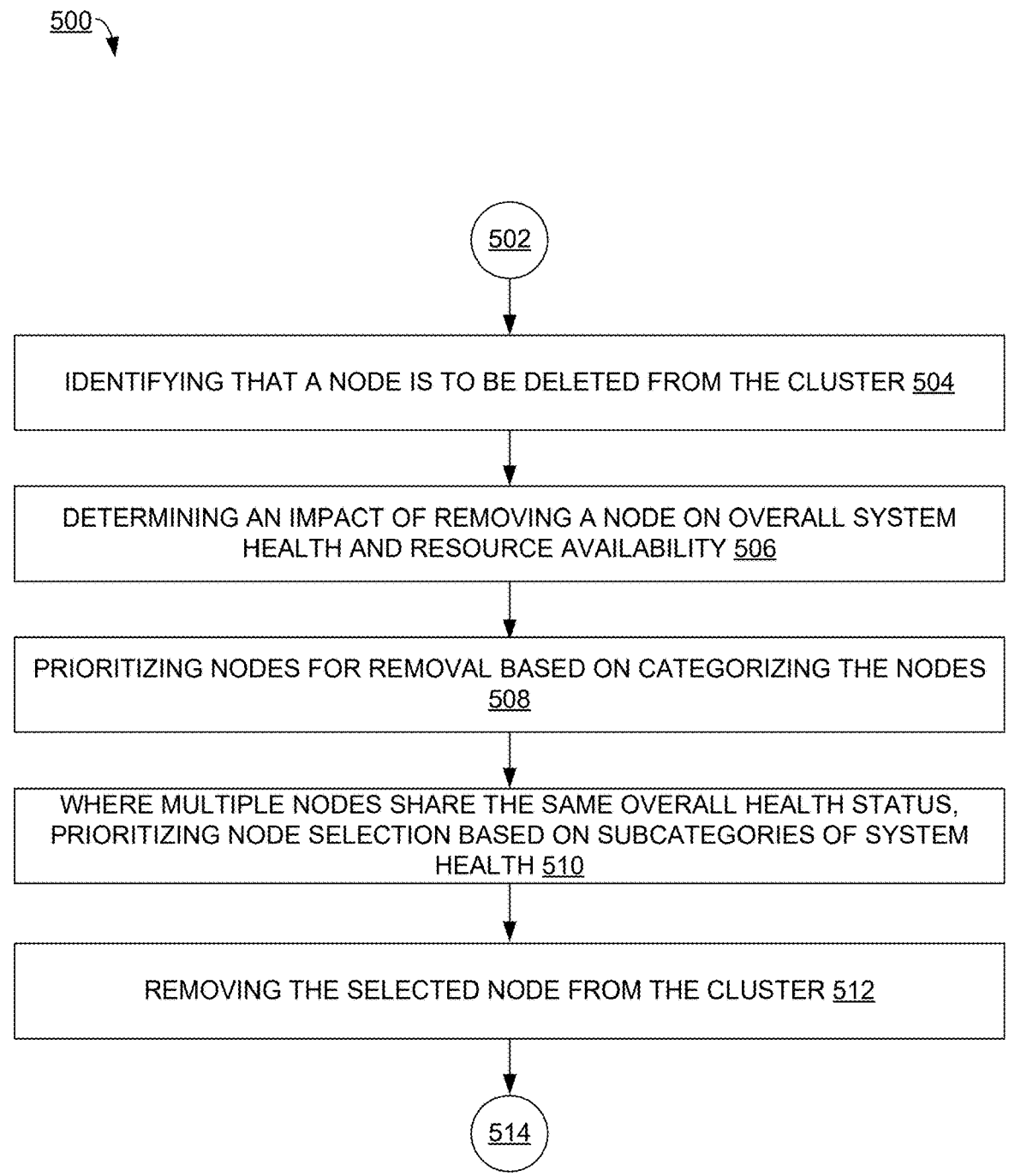
FIG. 5 illustrates an example process flow for removing a node from a cluster, and that can facilitate cluster node selection with off-band metrics, in accordance with an embodiment of this disclosure.

FIG. 5 illustrates an example process flow 500 for removing a node from a cluster, and that can facilitate cluster node selection with off-band metrics, in accordance with an embodiment of this disclosure. In some examples, one or more embodiments of process flow 500 can be implemented by system architecture 100 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 300 of FIG. 3, process flow 400 of FIG. 4, process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504.

Operation 504 depicts identifying that a node is to be deleted from the cluster.

After operation 504, process flow 500 moves to operation 506.

Operation 506 depicts determining an impact of removing a node on overall system health and resource availability.

After operation 506, process flow 500 moves to operation 508.

Operation 508 depicts prioritizing nodes for removal based on categorizing the nodes. For example, health can be identified based on statuses of Green: Healthiest; Yellow: Warning, less healthy; and Red: Critical, unhealthy.

After operation 508, process flow 500 moves to operation 510.

Operation 510 depicts, where multiple nodes share the same overall health status, prioritizing node selection based on subcategories of system health. In some examples, the priority order of subcategories of system health can be memory (highest priority), CPU, power, network, security, and accelerators.

After operation 510, process flow 500 moves to operation 512.

Operation 512 depicts removing the selected node from the cluster.

After operation 512, process flow 500 moves to 514, where process flow 500 ends.

Figure 6:
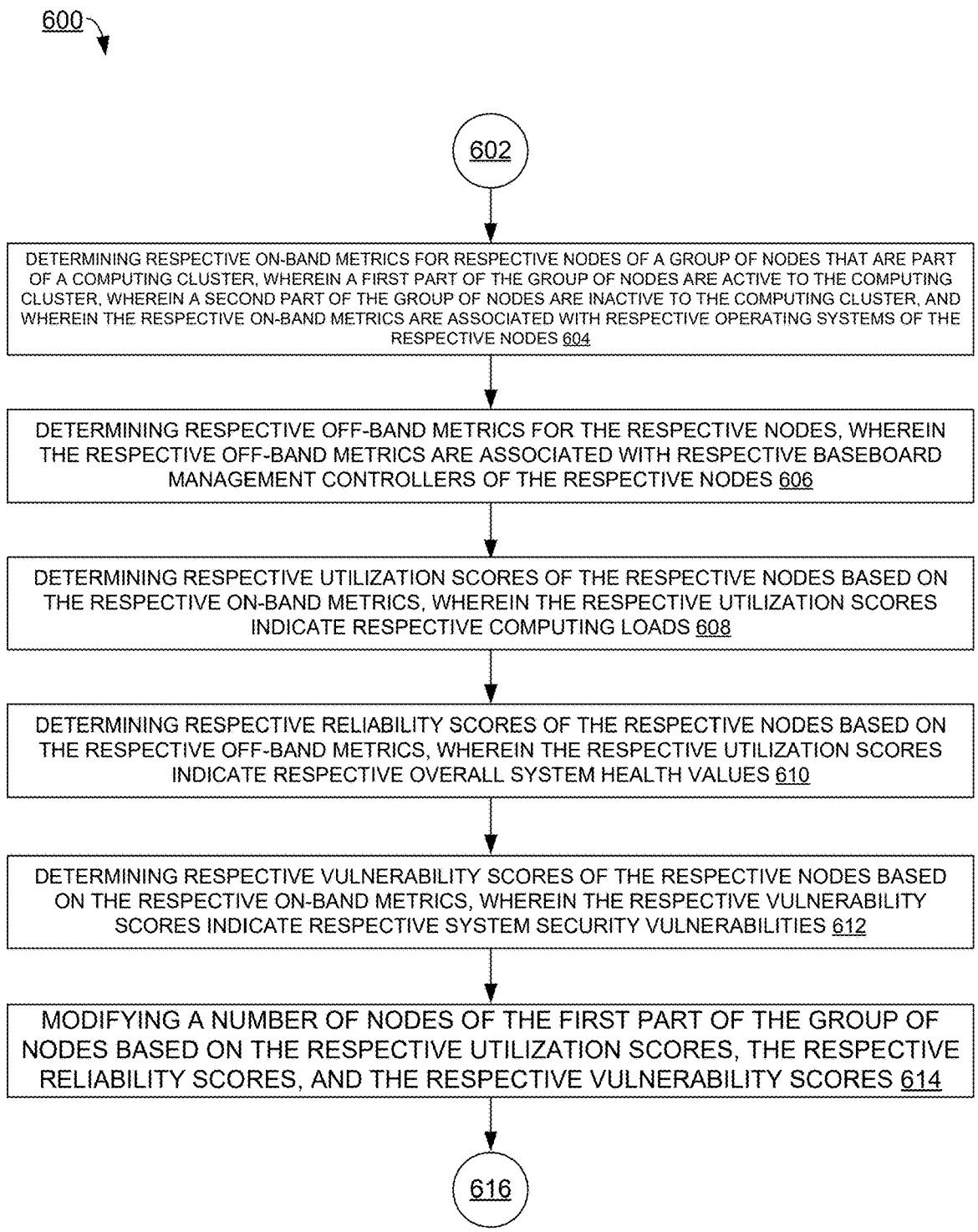
FIG. 6 illustrates an example process flow that can facilitate cluster node selection with off-band metrics, in accordance with an embodiment of this disclosure.

FIG. 6 illustrates an example process flow 600 for cluster node selection with off-band metrics, in accordance with an embodiment of this disclosure. In some examples, one or more embodiments of process flow 600 can be implemented by system architecture 100 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 300 of FIG. 3, process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts determining respective on-band metrics for respective nodes of a group of nodes that are part of a computing cluster, wherein a first part of the group of nodes are active to the computing cluster, wherein a second part of the group of nodes are inactive to the computing cluster, and wherein the respective on-band metrics are associated with respective operating systems of the respective nodes. Using the example of FIG. 1, the computing cluster can be cluster 102, the first part of the group of nodes are active to the computing cluster can be active nodes 106, and the second part of the group of nodes are inactive to the computing cluster can be inactive nodes 110. In operation 604, on-band metrics can be identified for these nodes.

In some examples, the respective on-band metrics indicate respective processor utilizations of the respective nodes or respective memory utilizations of the respective nodes. That is, a utilization score can be derived from on-band network analysis (e.g., CPU and/or memory analysis) to gauge a current server load of various nodes.

In some examples, the respective on-band metrics comprise respective application-specific metrics, and wherein the respective application-specific metrics are identified based on user input data that is associated with a user account that is associated with the computing cluster. That is, there can be support for custom metrics. This can facilitate tailor scaling decisions based on application-specific metrics, which can enable more precise and effective scaling strategies.

After operation 604, process flow 600 moves to operation 606.

Operation 606 depicts determining respective off-band metrics for the respective nodes, wherein the respective off-band metrics are associated with respective baseboard management controllers of the respective nodes. That is, off-band metrics can be identified for the nodes that are described with respect to operation 604.

In some examples, the respective off-band metrics indicate respective processor health values of the respective nodes, respective cooling system statuses of the respective nodes, or respective battery health statuses of the respective nodes. That is, off-band metrics can be designated to a baseboard management controller (BMC), providing metrics that encompass the comprehensive health status of the entire system, including aspects such as CPU health, cooling system, and/or battery health.

In some examples, the determining of the respective off-band metrics for the respective nodes comprises making respective representational state transfer application programming interface calls to the respective nodes. That is, API calls can be made collect information on and categorize overall system health, which can provide real-time insights for decision-making.

After operation 606, process flow 600 moves to operation 608.

Operation 608 depicts determining respective utilization scores of the respective nodes based on the respective on-band metrics, wherein the respective utilization scores indicate respective computing loads.

After operation 608, process flow 600 moves to operation 610.

Operation 610 depicts determining respective reliability scores of the respective nodes based on the respective off-band metrics, wherein the respective utilization scores indicate respective overall system health values.

After operation 610, process flow 600 moves to operation 612.

Operation 612 depicts determining respective vulnerability scores of the respective nodes based on the respective on-band metrics, wherein the respective vulnerability scores indicate respective system security vulnerabilities.

After operation 612, process flow 600 moves to operation 614.

Operation 614 depicts modifying a number of nodes of the first part of the group of nodes based on the respective utilization scores, the respective reliability scores, and the respective vulnerability scores.

In some examples, the modifying of the number of nodes of the first part of the group of nodes comprises adding a new node to the group of nodes or removing an existing node from the group of nodes. Using the example of FIG. 1, this can comprise moving a node from inactive nodes 110 to active nodes 106 (adding a node), or moving a node from active nodes 106 to inactive nodes 110 (removing a node).

After operation 614, process flow 600 moves to 616, where process flow 600 ends.

Figure 7:
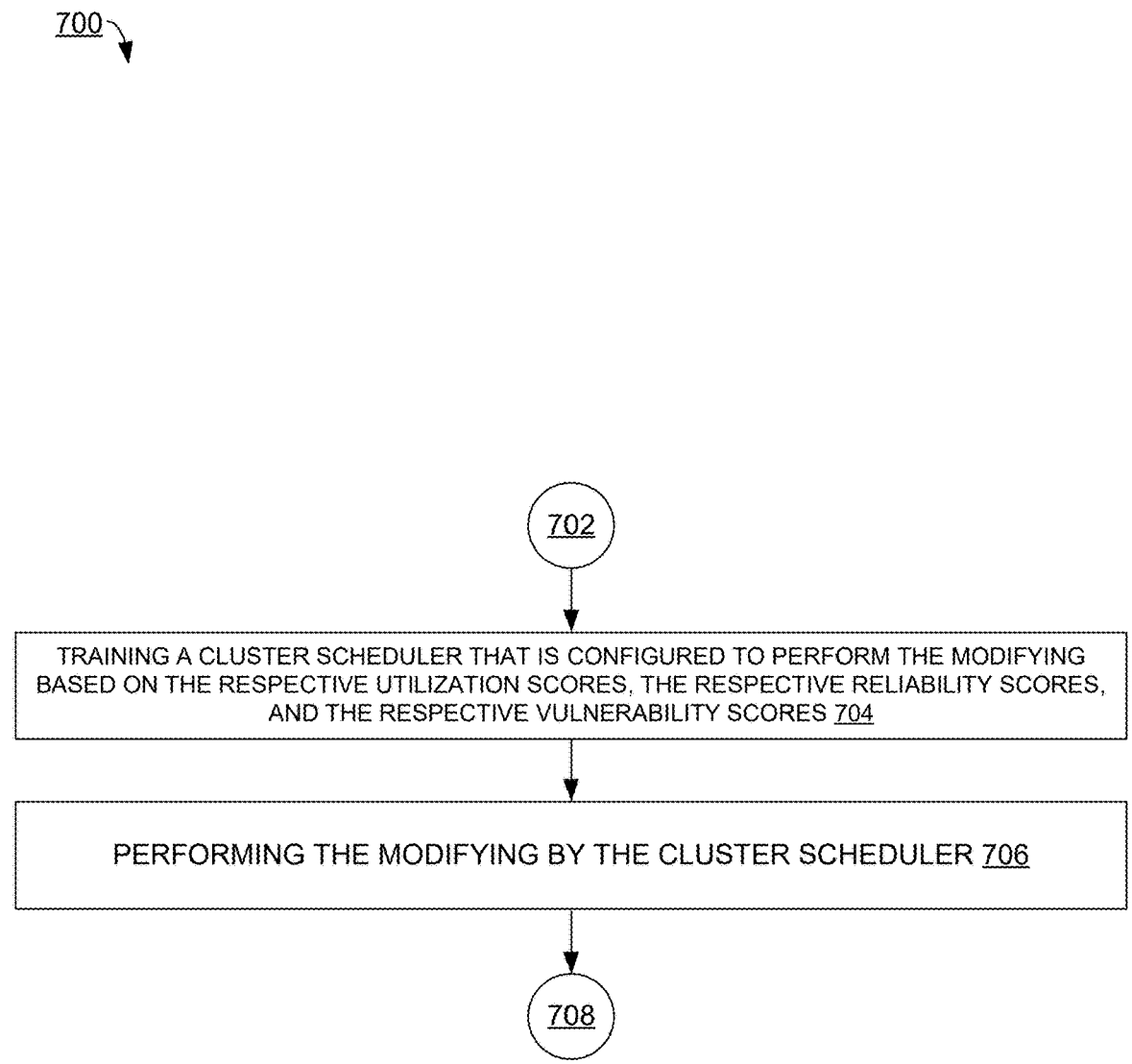
FIG. 7 illustrates another example process flow that can facilitate cluster node selection with off-band metrics, in accordance with an embodiment of this disclosure.

FIG. 7 illustrates another example process flow 700 for cluster node selection with off-band metrics, in accordance with an embodiment of this disclosure. In some examples, one or more embodiments of process flow 700 can be implemented by system architecture 100 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 300 of FIG. 3, process flow 400 of FIG. 4, process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704.

In some examples, process flow 700 is implemented in conjunction with process flow 600 of FIG. 6.

Operation 704 depicts training a cluster scheduler that is configured to perform the modifying based on the respective utilization scores, the respective reliability scores, and the respective vulnerability scores. That is, a cluster scheduler can be trained to dynamically add and/or remove nodes based on off-band metrics (and, in some examples, on-band metrics).

After operation 704, process flow 700 moves to operation 706.

Operation 706 depicts performing the modifying by the cluster scheduler.

That is, a trained cluster scheduler can determine which nodes to add and/or remove.

After operation 706, process flow 700 moves to 708, where process flow 700 ends.

Figure 8:
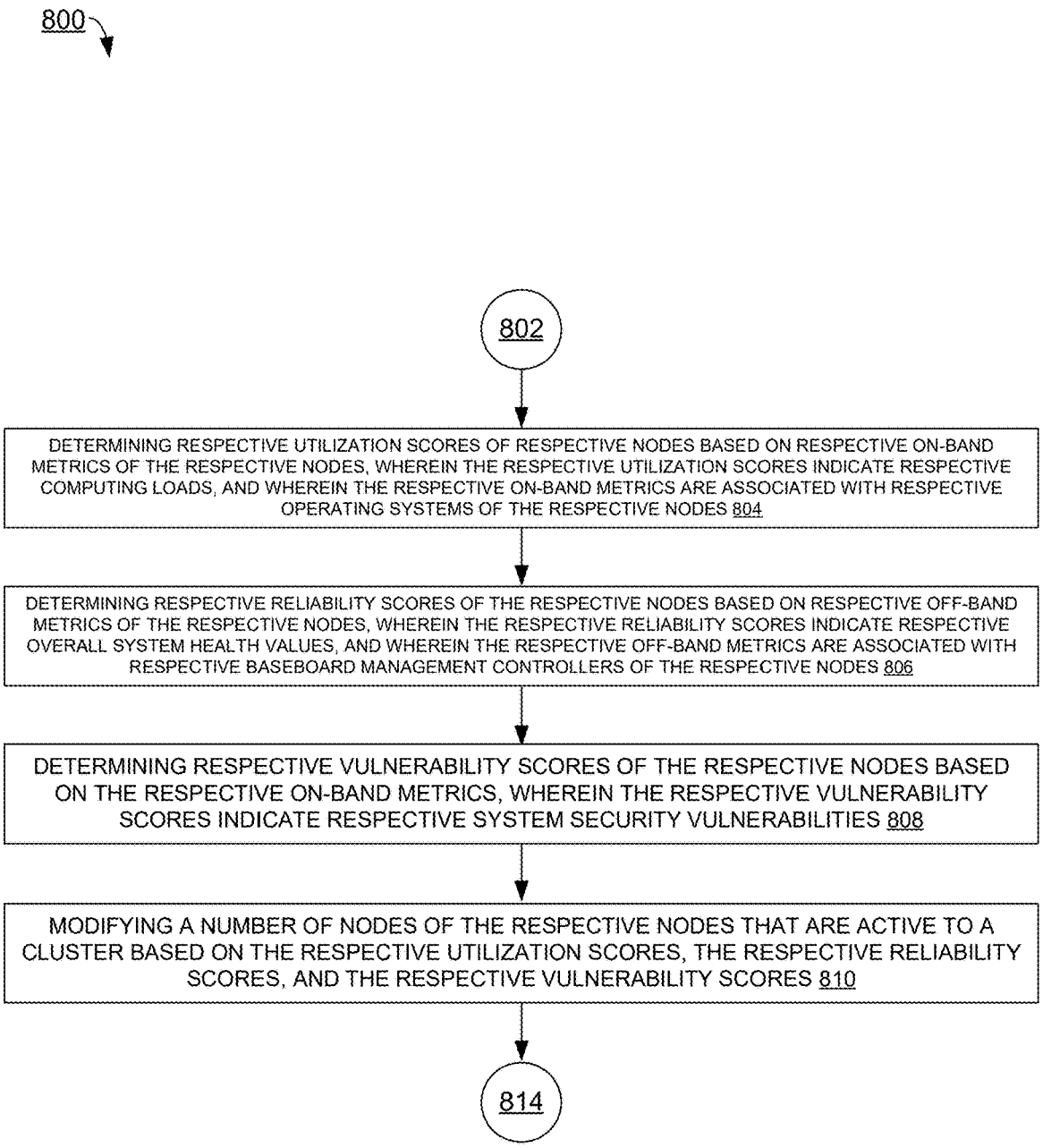
FIG. 8 illustrates another example process flow that can facilitate cluster node selection with off-band metrics, in accordance with an embodiment of this disclosure.

FIG. 8 illustrates another example process flow 800 for cluster node selection with off-band metrics, in accordance with an embodiment of this disclosure. In some examples, one or more embodiments of process flow 800 can be implemented by system architecture 100 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts determining respective utilization scores of respective nodes based on respective on-band metrics of the respective nodes, wherein the respective utilization scores indicate respective computing loads, and wherein the respective on-band metrics are associated with respective operating systems of the respective nodes. In some examples, operation 804 can be implemented in a similar manner as operations 604 and 608 of FIG. 6.

In some examples, operation 804 comprises determining the respective on-band metrics from a daemon that executes across the respective nodes and that is configured to enable access to a dynamic configuration registry. This can be similar to an etcd daemon.

In some examples, the respective on-band metrics comprise metrics relating to processors, battery, fans, temperature, memory, power, removable media, network devices, voltages, peripheral component interconnect express slots, intrusion, front panels, or hardware accelerators.

After operation 804, process flow 800 moves to operation 806.

Operation 806 depicts determining respective reliability scores of the respective nodes based on respective off-band metrics of the respective nodes, wherein the respective reliability scores indicate respective overall system health values, and wherein the respective off-band metrics are associated with respective baseboard management controllers of the respective nodes. In some examples, operation 804 can be implemented in a similar manner as operations 606 and 610 of FIG. 6.

After operation 806, process flow 800 moves to operation 808.

Operation 808 depicts determining respective vulnerability scores of the respective nodes based on the respective on-band metrics, wherein the respective vulnerability scores indicate respective system security vulnerabilities. In some examples, operation 808 can be implemented in a similar manner as operation 612 of FIG. 6.

After operation 808, process flow 800 moves to operation 810.

Operation 810 depicts modifying a number of nodes of the respective nodes that are active to a cluster based on the respective utilization scores, the respective reliability scores, and the respective vulnerability scores. In some examples, operation 810 can be implemented in a similar manner as operation 614 of FIG. 6.

In some examples, the modifying is performed by a scheduler of the system and is performed based on an autoscaler of the system determining that the respective nodes have a capacity that is below a defined threshold capacity or that demand for resources of the system has decreased beyond a defined threshold amount. That is, where more pods/nodes are to be scheduled, and existing nodes are running out of capacity; or when the demand for resources decreases, and there is excess capacity in the cluster, then a cluster autoscaler can communicate with a controller in a process of adding nodes to a cluster or removing nodes from the cluster.

In some examples, the modifying is performed based on a result of determining whether a new node is to be added to the respective nodes or an existing node is to be removed from the respective nodes, and the determining of whether the new node is to be added to the respective nodes or the existing node is to be removed from the respective nodes is performed after the determining of the respective on-band metrics. That is, after receiving information from a daemon, a controller checks whether a node is to be added to or removed from the cluster.

In some examples, operation 810 comprises adding a node to the respective nodes that are active to the cluster based on the node being determined to satisfy a good-health criterion among nodes of the respective nodes that are inactive to the cluster. That is, where scaling up is being performed, then a controller can take into consideration the off-band metrics (e.g., overall system health, CPU health, etc.) and on-band metrics (e.g., resource usage, pod scheduling failures, and other metrics) to pick a node with the best (or satisfactory) health to be added.

In some examples, operation 810 comprises removing a node from the respective nodes that are active to the cluster based on the node being determined to satisfy a poor-health criterion among nodes of the respective nodes that are active to the cluster. That is, where scaling down is being performed, then the controller can take into consideration the off-band metrics (e.g., overall system health, CPU health, etc.) and on-band metrics (e.g., resource usage, pod scheduling failures, and other metrics) to pick a node with the worst (or sufficiently poor) health to be removed.

After operation 810, process flow 800 moves to 812, where process flow 800 ends.

Figure 9:
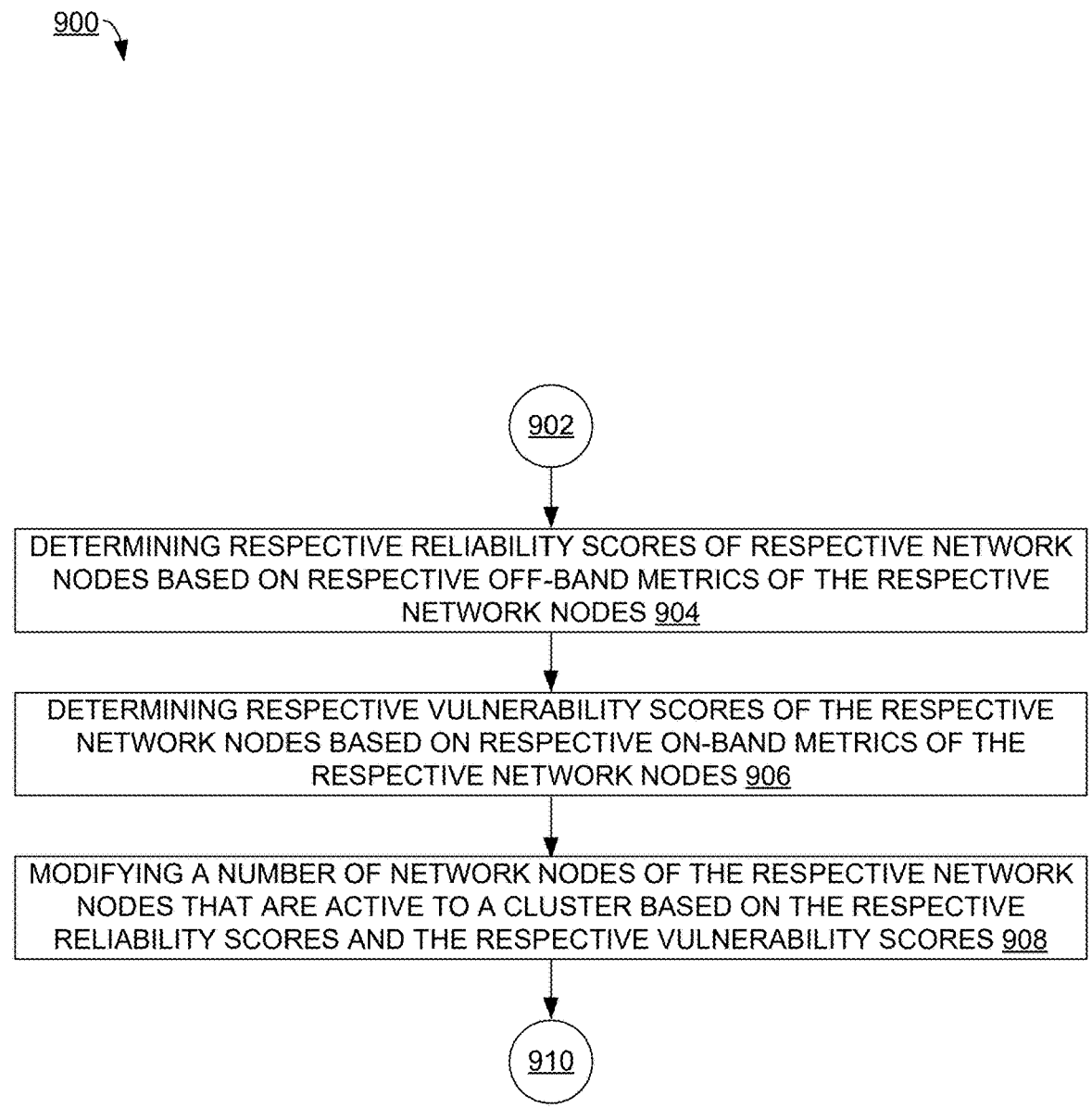
FIG. 9 illustrates another example process flow that can facilitate cluster node selection with off-band metrics, in accordance with an embodiment of this disclosure.

FIG. 9 illustrates another example process flow 900 for cluster node selection with off-band metrics, in accordance with an embodiment of this disclosure. In some examples, one or more embodiments of process flow 900 can be implemented by system architecture 100 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts determining respective reliability scores of respective network nodes based on respective off-band metrics of the respective network nodes. In some examples, operation 904 can be implemented in a similar manner as operations 606 and 610 of FIG. 6.

After operation 904, process flow 900 moves to operation 906.

Operation 906 depicts determining respective vulnerability scores of the respective network nodes based on respective on-band metrics of the respective network nodes. In some examples, operation 904 can be implemented in a similar manner as operations 604 and 612 of FIG. 6.

After operation 906, process flow 900 moves to operation 908.

Operation 908 depicts modifying a number of network nodes of the respective network nodes that are active to a cluster based on the respective reliability scores and the respective vulnerability scores. In some examples, operation 908 can be implemented in a similar manner as operation 614 of FIG. 6.

In some examples, operation 908 comprises determining respective utilization scores of respective network nodes based on the respective on-band metrics, wherein the modifying is performed based on the respective utilization scores.

In some examples, the respective utilization scores indicate respective computing loads, the respective on-band metrics are associated with respective operating systems of the respective network nodes, the respective reliability scores indicate respective overall system health values, the respective off-band metrics are associated with respective baseboard management controllers of the respective network nodes, and the respective vulnerability scores indicate respective system security vulnerabilities.

In some examples, the modifying of the number of network nodes of the respective network nodes that are active to the cluster comprises removing a network node, at least two network nodes share a least-healthy categorization among the respective network nodes, and operation 906 comprises selecting the network node based on a priority order of system health indications, wherein the priority order comprises at least two of memory, processing, power, network, security, and accelerators, and wherein the node is selected based on having a least-healthy system health indication of the at least two network nodes as indicated by the priority order of system health indications.

In some examples, the modifying of the number of network nodes of the respective network nodes that are active to the cluster comprises adding a network node, at least two network nodes of candidate network nodes for being added to the respective network nodes share a most-healthy categorization among the respective network nodes, and operation 906 comprises selecting the network node based on a priority order of system health indications, wherein the priority order comprises at least two of memory, processing, power, network, security, and accelerators, and wherein the network node is selected based on having a most-healthy system health indication of the at least two network nodes as indicated by the priority order of system health indications.

That is, where multiple nodes share a same health status, adding or removing a particular node can be prioritized based on subcategories of system health in a priority order of memory, CPU, power, network, security, accelerators.

After operation 908, process flow 900 moves to 910, where process flow 900 ends.

Figure 10:
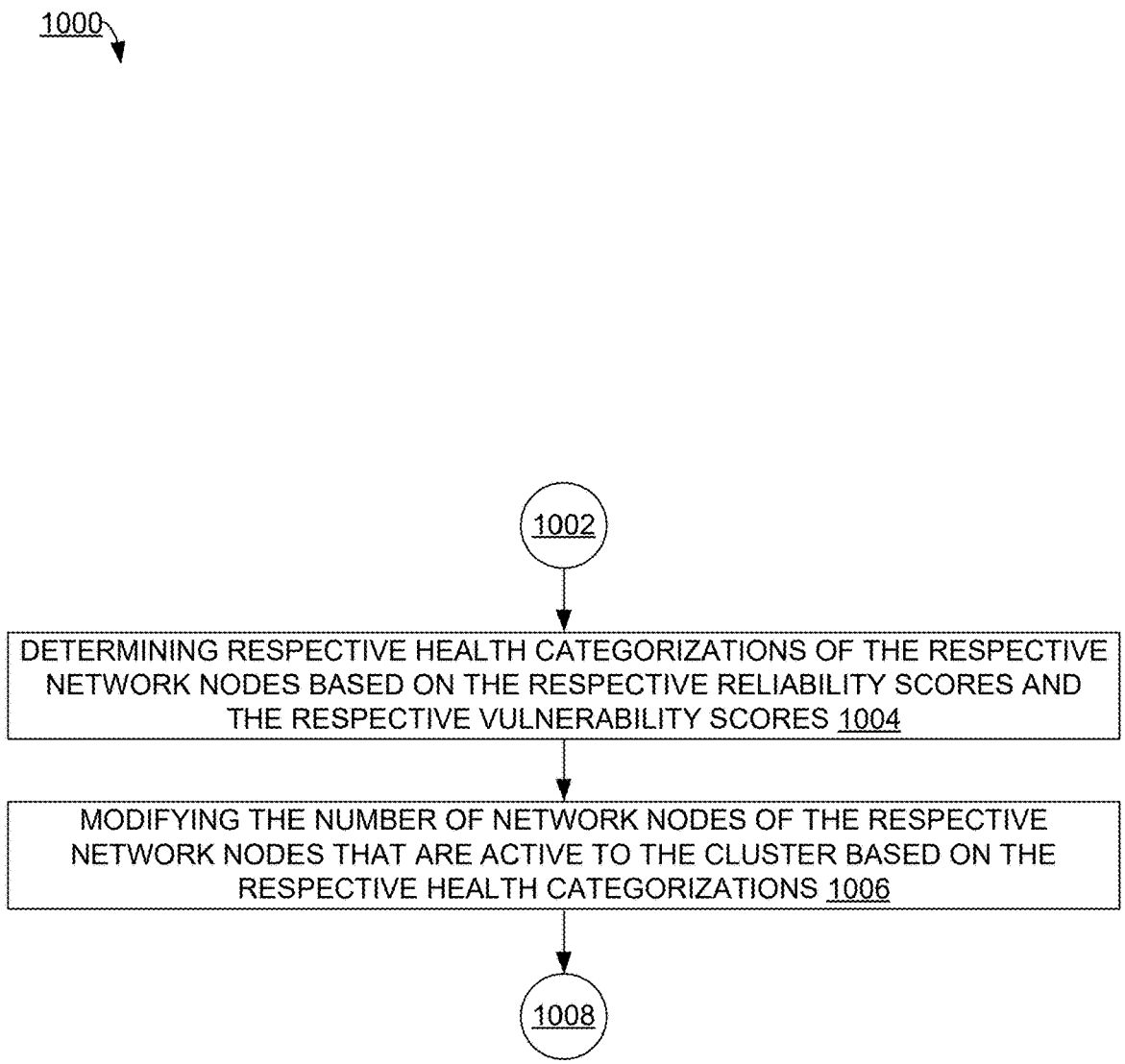
FIG. 10 illustrates another example process flow that can facilitate cluster node selection with off-band metrics, in accordance with an embodiment of this disclosure.

FIG. 10 illustrates another example process flow 1000 for cluster node selection with off-band metrics, in accordance with an embodiment of this disclosure. In some examples, one or more embodiments of process flow 1000 can be implemented by system architecture 100 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004.

In some examples, process flow 1000 is implemented in conjunction with process flow 900 of FIG. 9.

Operation 1004 depicts determining respective health categorizations of the respective network nodes based on the respective reliability scores and the respective vulnerability scores. That is, nodes can be categorized, such as Green, Yellow, or Red, as described herein.

After operation 1004, process flow 1000 moves to operation 1006.

Operation 1006 depicts modifying the number of network nodes of the respective network nodes that are active to the cluster based on the respective health categorizations. That is, a node can be selected for addition or removal based on its category. Where a node is being added, a Green node can be added. Where there are no Green nodes, a Yellow node can be added, or a Red node (where there are no Green or Yellow nodes). Similarly, where a node is being removed, a Red node can be removed. Where there are no Red nodes, a Yellow node can be removed, or a Green node (where there are no Red or Yellow nodes).

It can be appreciated that a categorization of Green, Yellow, or Red, is one example, and that other categorizations can be made (such as an integer value between 1 and 10, inclusive).

After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of cluster 102, active nodes 106, and/or inactive nodes 110 of FIG. 1.

In some examples, computing environment 1100 can implement one or more embodiments of the process flows of FIGS. 3-10 to facilitate cluster node selection with off-band metrics.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1116 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory that stores executable instructions that, when executed by the at least one processor, facilitate performance of operations, comprising:
determining respective on-band metrics for respective nodes of a group of nodes that are part of a computing cluster, wherein a first part of the group of nodes are active to the computing cluster, wherein a second part of the group of nodes are inactive to the computing cluster, and wherein the respective on-band metrics are associated with respective operating systems of the respective nodes;
determining respective off-band metrics for the respective nodes, wherein the respective off-band metrics are associated with respective baseboard management controllers of the respective nodes;
determining respective utilization scores of the respective nodes based on the respective on-band metrics, wherein the respective utilization scores indicate respective computing loads;
determining respective reliability scores of the respective nodes based on the respective off-band metrics, wherein the respective utilization scores indicate respective overall system health values;
determining respective vulnerability scores of the respective nodes based on the respective on-band metrics, wherein the respective vulnerability scores indicate respective system security vulnerabilities; and
modifying a number of nodes of the first part of the group of nodes based on the respective utilization scores, the respective reliability scores, and the respective vulnerability scores.

2. The system of claim 1, wherein the modifying of the number of nodes of the first part of the group of nodes comprises adding a new node to the group of nodes or removing an existing node from the group of nodes.

3. The system of claim 1, wherein the respective on-band metrics indicate respective processor utilizations of the respective nodes or respective memory utilizations of the respective nodes.

4. The system of claim 1, wherein the respective off-band metrics indicate respective processor health values of the respective nodes, respective cooling system statuses of the respective nodes, or respective battery health statuses of the respective nodes.

5. The system of claim 1, wherein the operations comprise:
training a cluster scheduler that is configured to perform the modifying based on the respective utilization scores, the respective reliability scores, and the respective vulnerability scores, wherein the cluster scheduler performs the modifying.

6. The system of claim 1, wherein the determining of the respective off-band metrics for the respective nodes comprises:
making respective representational state transfer application programming interface calls to the respective nodes.

7. The system of claim 1, wherein the respective on-band metrics comprise respective application-specific metrics, and wherein the respective application-specific metrics are identified based on user input data that is associated with a user account that is associated with the computing cluster.

8. A method, comprising:
determining, by a system comprising at least one processor, respective utilization scores of respective nodes based on respective on-band metrics of the respective nodes, wherein the respective utilization scores indicate respective computing loads, and wherein the respective on-band metrics are associated with respective operating systems of the respective nodes;
determining, by the system, respective reliability scores of the respective nodes based on respective off-band metrics of the respective nodes, wherein the respective reliability scores indicate respective overall system health values, and wherein the respective off-band metrics are associated with respective baseboard management controllers of the respective nodes;
determining, by the system, respective vulnerability scores of the respective nodes based on the respective on-band metrics, wherein the respective vulnerability scores indicate respective system security vulnerabilities; and
modifying, by the system, a number of nodes of the respective nodes that are active to a cluster based on the respective utilization scores, the respective reliability scores, and the respective vulnerability scores.

9. The method of claim 8, wherein the modifying is performed by a scheduler of the system and is performed based on an autoscaler of the system determining that the respective nodes have a capacity that is below a defined threshold capacity or that demand for resources of the system has decreased beyond a defined threshold amount.

10. The method of claim 8, further comprising:
determining, by the system, the respective on-band metrics from a daemon that executes across the respective nodes and that is configured to enable access to a dynamic configuration registry.

11. The method of claim 10, wherein the modifying is performed based on a result of determining whether a new node is to be added to the respective nodes or an existing node is to be removed from the respective nodes, and wherein the determining of whether the new node is to be added to the respective nodes or the existing node is to be removed from the respective nodes is performed after the determining of the respective on-band metrics.

12. The method of claim 8, wherein the modifying comprises:
adding a node to the respective nodes that are active to the cluster based on the node being determined to satisfy a good-health criterion among nodes of the respective nodes that are inactive to the cluster.

13. The method of claim 8, wherein the modifying comprises:
removing a node from the respective nodes that are active to the cluster based on the node being determined to satisfy a poor-health criterion among nodes of the respective nodes that are active to the cluster.

14. The method of claim 8, wherein the respective on-band metrics comprise metrics relating to processors, battery, fans, temperature, memory, power, removable media, network devices, voltages, peripheral component interconnect express slots, intrusion, front panels, or hardware accelerators.

15. A non-transitory computer-readable medium comprising instructions that, in response to execution, cause a system comprising at least one processor to perform operations, comprising:
determining respective reliability scores of respective network nodes based on respective off-band metrics of the respective network nodes;
determining respective vulnerability scores of the respective network nodes based on respective on-band metrics of the respective network nodes; and
modifying a number of network nodes of the respective network nodes that are active to a cluster based on the respective reliability scores and the respective vulnerability scores.

16. The non-transitory computer-readable medium of claim 15, wherein the operations further comprise:
determining respective utilization scores of respective network nodes based on the respective on-band metrics,
wherein the modifying is performed based on the respective utilization scores.

17. The non-transitory computer-readable medium of claim 16,
wherein the respective utilization scores indicate respective computing loads,
wherein the respective on-band metrics are associated with respective operating systems of the respective network nodes,
wherein the respective reliability scores indicate respective overall system health values,
wherein the respective off-band metrics are associated with respective baseboard management controllers of the respective network nodes, and
wherein the respective vulnerability scores indicate respective system security vulnerabilities.

18. The non-transitory computer-readable medium of claim 15, wherein the operations further comprise:
determining respective health categorizations of the respective network nodes based on the respective reliability scores and the respective vulnerability scores,
wherein the modifying of the number of network nodes of the respective network nodes that are active to the cluster is performed based on the respective health categorizations.

19. The non-transitory computer-readable medium of claim 18, wherein the modifying of the number of network nodes of the respective network nodes that are active to the cluster comprises removing a network node, wherein at least two network nodes share a least-healthy categorization among the respective network nodes, and wherein the operations further comprise:
selecting the network node based on a priority order of system health indications, wherein the priority order comprises at least two of memory, processing, power, network, security, and accelerators, and wherein the node is selected based on having a least-healthy system health indication of the at least two network nodes as indicated by the priority order of system health indications.

20. The non-transitory computer-readable medium of claim 18, wherein the modifying of the number of network nodes of the respective network nodes that are active to the cluster comprises adding a network node, wherein at least two network nodes of candidate network nodes for being added to the respective network nodes share a most-healthy categorization among the respective network nodes, and wherein the operations further comprise:
selecting the network node based on a priority order of system health indications, wherein the priority order comprises at least two of memory, processing, power, network, security, and accelerators, and wherein the network node is selected based on having a most-healthy system health indication of the at least two network nodes as indicated by the priority order of system health indications.

\* \* \* \* \*